United States Patent
Lübcke

(10) Patent No.: US 10,988,144 B2
(45) Date of Patent: Apr. 27, 2021

(54) DRIVER ASSISTANCE SYSTEM AND METHOD FOR A MOTOR VEHICLE FOR DISPLAYING AN AUGMENTED REALITY

(71) Applicant: AUDI AG, Ingolstadt (DE)

(72) Inventor: Michael Lübcke, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/299,603

(22) Filed: Mar. 12, 2019

(65) Prior Publication Data
US 2019/0283776 A1    Sep. 19, 2019

(30) Foreign Application Priority Data
Mar. 14, 2018  (DE) .......................... 102018203910.0

(51) Int. Cl.
*B60W 50/14*  (2020.01)
*G06T 19/00*  (2011.01)
*B60R 1/00*   (2006.01)

(52) U.S. Cl.
CPC .............. *B60W 50/14* (2013.01); *B60R 1/00* (2013.01); *G06T 19/006* (2013.01);
(Continued)

(58) Field of Classification Search
CPC ...... B60W 50/14; B60R 1/00; B60R 2300/00; B60R 2300/305; G06T 19/006
See application file for complete search history.

(56) References Cited

U.S. PATENT DOCUMENTS

2013/0250070 A1    9/2013  Takayama
2014/0333729 A1*  11/2014  Pflug ....................... G06T 15/20
                                                            348/47
(Continued)

FOREIGN PATENT DOCUMENTS

DE       10354641 A1    6/2005
DE    102012014467 A1    1/2014
(Continued)

OTHER PUBLICATIONS

German Examination Report dated Nov. 28, 2018 in corresponding German Application No. 102018203910.0; 16 pages.
(Continued)

*Primary Examiner* — Grace Q Li
(74) *Attorney, Agent, or Firm* — Maier & Maier, PLLC

(57) ABSTRACT

A driver assistance system for a motor vehicle having a first assistance subsystem for capturing a first sub-area of an environment of the motor vehicle and having a second assistance subsystem for capturing a second sub-area of the environment. The first assistance subsystem is configured to generate a first image of the first sub-area and the second assistance subsystem is configured to generate a second image of the second sub-area. The driver assistance system has a display device for displaying at least the first image. The display device being configured to display a first augmented reality, the first augmented reality being generated by superimposition of the first image with first assistance information of the first assistance subsystem as the first augmented reality content and by superimposition with second assistance information of the second assistance subsystem as the second augmented reality content.

9 Claims, 1 Drawing Sheet

(52) U.S. Cl.
 CPC ..... *B60R 2300/00* (2013.01); *B60R 2300/305* (2013.01); *B60R 2300/8046* (2013.01); *B60W 2050/146* (2013.01)

(56) References Cited

U.S. PATENT DOCUMENTS

| | | |
|---|---|---|
| 2015/0197197 A1 | 7/2015 | Watanabe et al. |
| 2017/0280091 A1* | 9/2017 | Greenwood .............. B60R 1/00 |
| 2018/0218758 A1* | 8/2018 | Maeda .................... H04N 5/907 |
| 2019/0079717 A1* | 3/2019 | Lee ......................... G06F 3/013 |
| 2020/0117187 A1* | 4/2020 | Kothari .................. G08G 1/166 |

FOREIGN PATENT DOCUMENTS

| | | |
|---|---|---|
| DE | 102014211803 A1 | 12/2015 |
| DE | 102015202330 A1 | 8/2016 |
| DE | 102015122997 A1 | 7/2017 |
| WO | 2014/130049 A1 | 8/2014 |

OTHER PUBLICATIONS

European Search Report dated May 20, 2019, in connection with EP Application No. 19160670.6 (10 pgs., including English translation).

\* cited by examiner

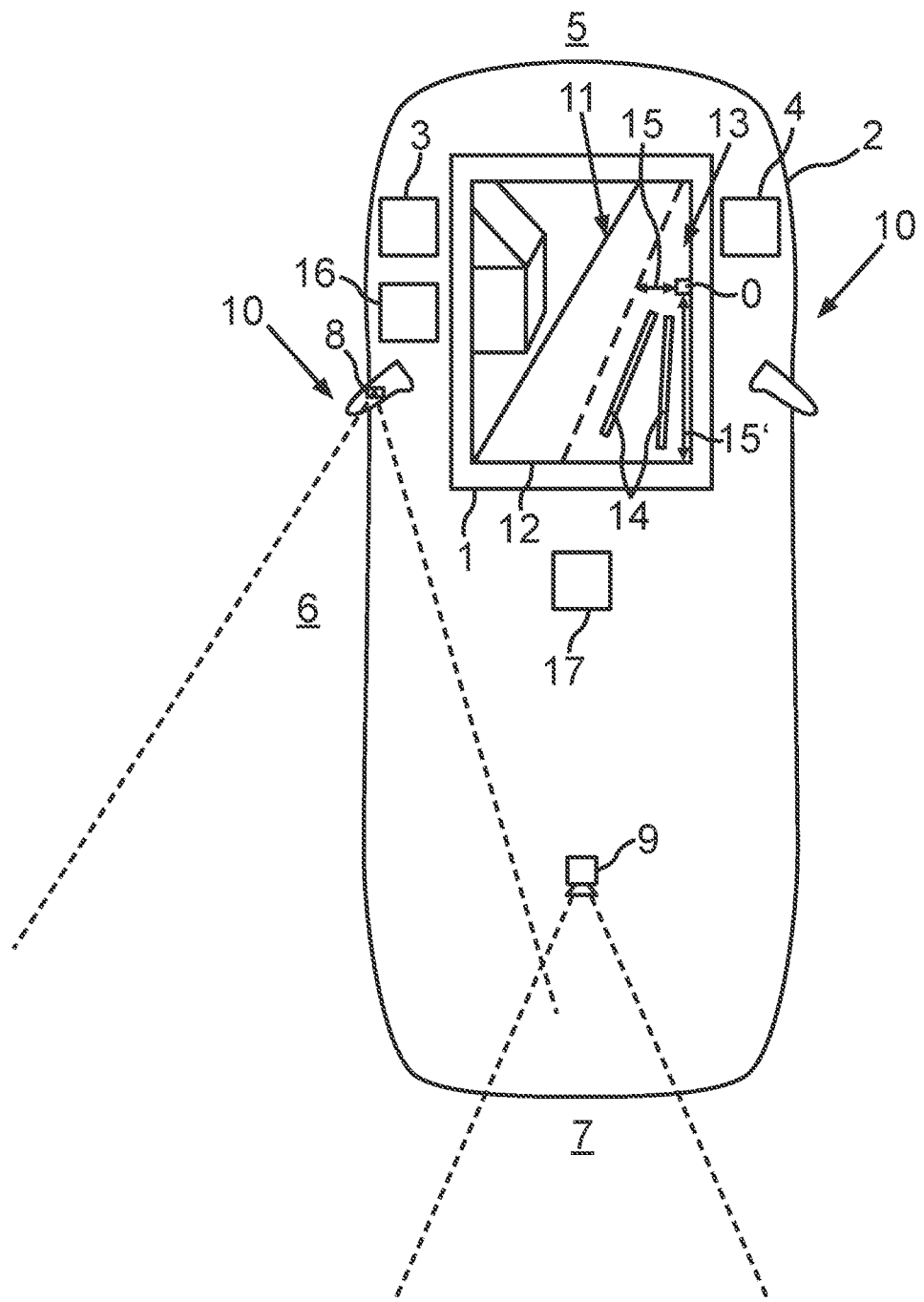

DRIVER ASSISTANCE SYSTEM AND METHOD FOR A MOTOR VEHICLE FOR DISPLAYING AN AUGMENTED REALITY

FIELD

This invention relates to a driver assistance system for a motor vehicle. The driver assistance system has a first assistance subsystem to sense the first sub-area of the motor vehicle's surrounding environment and a second assistance subsystem to sense the second sub-area of the vehicle's surrounding environment. The first assistant subsystem is configured to generate a first image of the first sub-area and the second assistant subsystem is configured to generate a second image of the second sub-area. The driver assistance system has a display device for displaying at least the first image. Further, the invention relates to a method of operating a driver assistance system.

BACKGROUND

Electronic mirror systems are already known in the art, with cameras and displays (screens) replacing the actual mirror. This is both a replacement for the traditional exterior rear-view mirrors on the doors and a replacement, e.g. for an interior rear-view mirror in the interior of a motor vehicle. Here, the cameras are preferably located in positions that offer similar perspectives to those of the omitted mirrors, for example on an A-pillar/door panel or a rear edge of the roof. The displays can sometimes also show additional information, for example distance markers or markers of approaching motor vehicles, for example with a lane change assistant, with a blind spot detection assistant or with an overtaking assistant. In the case of support for a parking situation, this support is usually limited to a vertical shift in the image section of the passenger-side image, corresponding to a lowering of the mirror.

Also known are camera-based systems, so-called "view systems", for support in parking and maneuvering situations. These are, for example, rear view cameras or multi-camera systems with, for example, video images composed of four cameras.

Individual views of certain areas are also implemented here. These in turn display distance markers of the parking support as well as auxiliary lines which correspond, for example, to the markers of the found parking spot, the current vehicle driving channel at the current steering angle or the planned trajectory during automatic parking. The displays of separate functions such as the maneuvering assistant, rim protection and the trailer maneuvering assistant are also implemented in the views.

The individual assistance subsystems, such as the electronic rear-view mirror or the reversing camera, work independently of each other in state-of-the-art technology and use separate display locations and displays in particular. In particular, the absence of information, markers, instructions or auxiliary lines from the assistance subsystem which are not found on the other display location or display can make an impression of inconsistency on the driver.

Depending on the image section, the electronic mirrors now show partially overlapping areas to the view systems in accordance with the state of the art, whereby the distance markers of the parking support or auxiliary lines are missing, although surrounding objects can be seen better or at least from a different perspective.

DE 10 2015 122 997 A1 discloses a method for representing a rear outer area of a motor vehicle with at least one camera element on the motor vehicle. The camera element is adjusted in different camera settings and, depending on these camera settings, the camera element senses different exterior, camera setting-dependent capturing areas.

SUMMARY

The object of this invention is to create a driver assistance system and a method by which additional information can be displayed on a display device for a driver of a motor vehicle.

One aspect of the invention relates to a driver assistance system for a motor vehicle. The driver assistance system includes a first assistance subsystem to sense a first sub-area of a vehicle's surrounding environment. In addition, the driver assistance system includes a second assistance subsystem for sensing a second sub-area of the environment. The first assistant subsystem is configured to generate a first image of the first sub-area and the second assistant subsystem is configured to generate a second image of the second sub-area. The driver assistance system has a display device for displaying at least the first image.

It is provided that the display device is adapted to display a first augmented reality (AR), wherein the first augmented reality is generated by superimposing the first image with first assistance information of the first assistance subsystem generated on the basis of the first image as first augmented reality content and by superimposing with second assistance information of the second assistance subsystem generated on the basis of the second image as second augmented reality content.

This facilitates the display not only of the first augmented reality content, which is generated in dependence of the first image, but also the second assistant information as the second augmented reality content. Thus, information from the second assistance subsystem and the first assistance subsystem can be displayed on the display device so that the driver receives additional information from the second assistance subsystem. This creates a more informative information display of the motor vehicle's environmental information for the driver of the motor vehicle.

In particular, it can be provided that the sub-areas overlap and/or that the sub-areas at least partially represent different perspectives of the environment.

In camera-based assistance subsystems, for example, also known as "view systems", auxiliary lines and trajectories can be embedded in the image in a way that corresponds to a projection onto the road plane, so that an optical superimposition of the auxiliary lines and the trajectories with the captured image can be displayed. Among other things, this can help the driver to assess whether the motor vehicle is colliding with surrounding objects or to align it to a parking marker and/or curbstone or similar. Especially in semi-automated and/or automated parking as a partial aspect of automated driving, this is an essential characteristic for fulfilling a monitoring obligation as driver of the motor vehicle, if applicable. In particular, a specific partial view can thus be selected for the different images, and the electronic rear-view mirror, for example, can be taken into account in this field of vision, so that this detailed view can be displayed with the display device. This can therefore provide a consistent, coherent and complete display for the driver of the motor vehicle.

For example, the marker of relevant vehicles and objects detected by the second assistance subsystem can then also be displayed on the display device in the first image of the first assistance subsystem. In addition, a marker of occupied lanes, for example for a lane change assistant, or a "blind spot detection", which was performed by the second assistance subsystem, can also be displayed in the first image of the first assistance subsystem.

A further aspect, in particular a technical merger of the systems, for example by means of a common control unit, can result in further advantages. For example, improved 3D representation in the camera-based assistance subsystems can be realized with more cameras. Improved quality can also be realized through more different viewing angles and focal lengths of the respective camera-based assistance subsystems. Furthermore, quality improvement can be achieved by mutual comparison during calibration. A uniform display of markers, auxiliary lines and the like can also be carried out, as these are placed in a common environment presentation relative to the motor vehicle. Furthermore, an improved environmental reconstruction of the image evaluation can be performed, since more input channels with different relative directions of movement can be provided for at least one "structure-from-motion" approach. Image content can also be complemented, especially in an overlapping area.

In accordance with an advantageous form of configuration, the display device can be adapted to display a second augmented reality, wherein the second augmented reality is produced by superimposing the second image with the second augmented reality content and by superimposing with the first augmented reality content. In other words, the first augmented reality and the second augmented reality can be displayed together on the display device. The driver can thus display both the first augmented reality and the second augmented reality on one display device. The driver of the motor vehicle can therefore see the information of the first assistance subsystem and the information of the second assistance subsystem at a single glance. In each case, this is supplemented by the information of the additional assistance subsystem. This allows the driver of the motor vehicle to see the two augmented realities on a common display device, so that he can intuitively perceive the information from the assistance subsystems and thus operate the motor vehicle more reliably.

It is of equal advantage when the display device is adapted to display at least the first image and the second image having the first augmented reality content and the second augmented reality content as a merged common augmented reality. A camera-based assistance subsystem can therefore be provided by means of the display device. For example, a 3D display can be provided. It is also possible, for example, to provide a top view assistant. In particular, provision can be made for further information to be provided to the display device from additional assistance subsystems. Thus a merger of the other assistance subsystems can also be facilitated. This enables a reliable and improved display of information on the display device for the driver.

In another advantageous configuration, the first sub-area can be captured using a first camera of the first assistance subsystem and/or the second sub-area can be captured using a second camera of the second assistance subsystem. Cameras in particular are already established systems within the motor vehicle. In particular, the motor vehicle already has several cameras installed, which can be used to detect the first and/or second sub-area. In particular, the information from these cameras can be used to generate the first image and/or the second image. Furthermore, the cameras are specifically configured with high resolution, so that improved capture of the first sub-area and/or the second sub-area is possible. This allows at least a more informative first augmented reality to be generated so that improved representation of various information can be realized for the driver of the motor vehicle.

It is of equal advantage when the first assistance subsystem and/or the second assistance subsystem are each configured as electronic rear-view mirrors. For example, an electronic rear-view mirror can then be located on the left side of the motor vehicle and/or a second electronic rear-view mirror can be located on the right side of the motor vehicle. In particular, they can be located in the area of the front fender and/or in the area of a door of the motor vehicle and/or behind a roof edge of the motor vehicle. This list is purely exemplary and by no means exhaustive. The electronic rear-view mirror is in particular a camera which covers the reversing area which can otherwise be viewed through the side mirror. In this case, one particular camera captures this sub-area and projects the captured image of the captured sub-area onto a display device of the electronic rear-view mirror. The display device of the electronic rear-view mirror can be located in the interior of the motor vehicle in particular, so that it is protected from environmental influences, which also prevents reflections, for example through the side window.

It is also possible that the first assistance subsystem and/or the second assistance subsystem are configured as an electronic reversing camera. When reversing, it is particularly advantageous if the driver of the motor vehicle can be provided additional information about the rear driving channel, for example, as it is often not possible for the driver to look directly into the rear space. In particular, by merging the first assistance information with the second assistance information, the electronic reversing camera can provide the driver with additional important information regarding the trajectory, so that the driver is shown the additional information, thus enabling reliable motor vehicle operation for the driver.

It has also proven to be advantageous if the first augmented reality content and/or the second augmented reality content is formed as a virtual driving channel and/or as a virtual distance marker, in particular to an object, for example, and/or as a virtual auxiliary line, in particular to an identified parking area, for example, and/or as a current trajectory of the motor vehicle and/or as a trailer trajectory of the motor vehicle with a trailer. In particular, the merger of the above-mentioned augmented reality contents can thus reliably create a consistent image for the driver so that he can reliably operate the motor vehicle. For example, it can be provided that the first augmented reality content to be displayed is a virtual driving channel using the first assistance subsystem. In addition, the distance markers from the second assistance subsystem can then, for example, be merged into the display device to form one object. Furthermore, it can also be provided that if, for example, the motor vehicle is coupled to a trailer, the display device displays both virtual auxiliary lines through the first assistance subsystem, for example for an identified parking area, and also the trajectory of the trailer as a trailer maneuvering system as the second assistance subsystem. This enables the realization of a comfortable display for the driver, so that he can reliably monitor his surroundings.

In accordance with a further advantageous form of configuration, the driver assistance system is configured such that, by means of at least one further display device of the first assistance subsystem, at least the first image superimposed with the first augmented reality content and/or the first augmented reality can additionally be displayed and/or at least the second image superimposed with the second augmented reality content and/or by means of at least one further display device of the second assistance subsystem, at least the second image superimposed with the second augmented reality content and/or a second augmented reality can be additionally displayed. This can serve to create a redundancy and, in particular, the appropriate display can be provided for the driver of the motor vehicle when the driver is looking in several directions. The assistance information can thus still be reliably provided when the driver is looking at different, especially changing, directions, for example during a parking process. For example, a display device of an electronic rear-view mirror can display the first augmented reality as the first display device and, for example, the first augmented reality can also be displayed on an additional display device which is located, for example, in the center console of the motor vehicle. This allows the corresponding augmented reality to be displayed both when looking to the left and when looking to the center console, making the motor vehicle more reliable to operate for the driver.

In a further advantageous configuration, the driver assistance system is configured for operation in numerous operating states of the motor vehicle, in particular in an at least partially autonomous operating state and/or when the operating state is a parking maneuver in particular. In particular, the assistance information can be merged when the motor vehicle is in different operating states. In particular, several assistance subsystems, which are used under the different operating states of the motor vehicle, can thus be merged. In particular, assistance subsystems, which are usually unused or deactivated above a specified speed threshold value, can also be used so that the information can also be made available at speeds above the speed threshold value. For example, the information from a parking assistant can be used as an assistance subsystem during normal driving operations. For example, the assistance information can also be merged with a distance assistance system and a lane change assistance system.

Another aspect of the invention relates to a method for operating a driver assistance system for a motor vehicle. By means of a first assistance subsystem, a first sub-area of an environment of the motor vehicle is captured and by means of a second assistance subsystem, a second sub-area of the environment is captured. A first image of the first sub-area is generated by means of the first assistant subsystem and a second image of the second sub-area is generated by means of the second assistant subsystem. At least the first image is displayed by means of a display device of the driver assistance system.

It is intended that a first augmented reality will be displayed by means of the display device. The first augmented reality is generated by superimposing the first image with a first assistance information generated on the base of the first image, the first assistance subsystem as the first augmented reality content and the second assistance subsystem as the second augmented reality content by superimposing a second assistance information generated on the base of the second image.

Advantageous configurations of the driver assistance system shall be regarded as advantageous configurations of the method. The driver assistance subsystem has objective features which enable a method or an advantageous design thereof to be implemented.

BRIEF DESCRIPTION OF DRAWINGS

The following describes examples of how the invention was embodied.

FIG. 1 shows an embodiment of a driver assistance system.

DETAILED DESCRIPTION

The examples of embodiment explained below are the preferred embodiment of the invention. In the examples of embodiment, the described components of the forms of embodiment each represent individual characteristics of the invention which must be considered independently of each other and which further develop the invention independently of each other and must thus also be regarded individually or in a combination other than the one shown as part of the invention. In addition, the forms of embodiment described can be supplemented by other features of the invention already described.

In FIG. 1, functionally identical elements are each provided with the same reference numerals.

FIG. 1 in a schematic view shows an embodiment of a driver assistance system 1. The driver assistance system 1 is configured in a motor vehicle 2. The driver assistance system 1 comprises a first assistance subsystem 3 and a second assistance subsystem 4. The respective assistance subsystems 3, 4 are configured to detect the environment 5 of the motor vehicle 2. In particular, the first assistance subsystem 3 captures a first sub-area 6 of the environment 5 and the second assistance subsystem 4 captures a second sub-area 7 of the environment 5. Sub-areas 6, 7 overlap at least partially. Alternatively, sub-areas 6, 7 can also be different perspectives of the environment 5, whereby the perspectives then overlap at least partially.

Especially the first assistance subsystem 3 has a first camera 8. In this example, it is particularly provided that the first assistance subsystem 3 is configured as an electronic rear-view mirror 10. In this example, the second assistance subsystem 4 has a second camera and is configured as a rearward facing reversing camera 9. This form of embodiment is purely exemplary and by no means exhaustive.

By means of the first assistance subsystem 3, a first image 11 of the first sub-area 6 can be generated, especially with camera 8. By means of the second assistance subsystem 4, in particular by means of the reversing camera 9, an unrepresented second image of the second sub-area 7 can be generated. The driver assistance system 1 also has a display device 12. At least the first image 11 can be displayed by means of the display device 12.

It is provided that the display device 12 is configured to display a first augmented reality 13, wherein the first augmented reality 13 is generated by superimposing the first image 11 with first assistance information of the first assistance subsystem 3 generated on the basis of the first image 11 as first augmented reality content 14 and by superimposing second assistance information of the second assistance subsystem 4 generated on the basis of the second image as second augmented reality content 15. In other words, the first augmented reality 13 is generated both with the image 11 and with the first augmented reality content 14, which is presently configured as a driving channel, and with the second augmented reality content, which is presently configured, for example, as distance information 15, 15'. The distance information 15, 15' can, for example, be configured as transverse distance information 15 to an object O and/or as longitudinal distance information 15' to an object O.

Further, the display device 12 can be configured to display a second augmented reality, the second augmented reality being generated by superimposing the second image with the second augmented reality content 15 and by superimposing with the first augmented reality content 14.

Furthermore, the display device 12 can be configured to display the at least first image 11 and the second image with the first augmented reality content 14 and the second augmented reality content 15 as a merged, common augmented reality. In particular, the common augmented reality can lead to a merger of assistance information from other assistance subsystems. For example, the common augmented reality can then be used as a top view assistant or merged to create a 3D display.

In particular, it can be provided that the first augmented reality content 14 and/or the second augmented reality content 15 are/is configured as a virtual driving channel and/or as a virtual distance marker, in particular to an object, and/or as a virtual auxiliary line, in particular an identified parking area, and/or as a current trajectory of the motor vehicle 2 and/or as a trailer trajectory of the motor vehicle 2 with a trailer. In particular, the different assistance information of different assistance subsystems 3, 4 can therefore be displayed.

Furthermore, it can be provided in particular that at least the first image 11 superimposed with the first augmented reality content 14 and/or the first augmented reality 13 is additionally displayed by means of at least one further display device 16 of the first assistance system 3. Alternatively or additionally, at least the second image superimposed with the second assistance information and/or at least the second image superimposed with the second augmented reality content 15 and/or the second augmented reality can be additionally displayed by means of at least one still further display device 17 of the second assistance subsystem 4.

It may also be provided that the driver assistance system 1 is configured for operation in numerous operating states of the motor vehicle 2, in particular in an at least partially autonomous operating state and/or when the operating state is a parking maneuver in particular. In particular, the first augmented reality 13 with the first augmented reality content 14 and the second augmented reality content 15 can thus be displayed both while reversing and driving forward or also during semi-autonomous or autonomous driving of the motor vehicle. In particular, assistance subsystems 3,4, which are usually unused or deactivated above a specified speed threshold value, can also be used so that the information can also be made available at speeds above the speed threshold value. For example, the information from a parking assistant can be used as an assistance subsystem 3,4 during normal driving operations. The driver assistance system 1 can thus be used as a parking assistance system and/or as a top view assistance system and/or as a trailer assistance system.

In the method for operating the driver assistance system 1 for motor vehicle 2, the first assistance subsystem 3 captures the first sub-area 6 of the environment 5 and the second assistance subsystem 4 captures the second sub-area 7. The first image 11 of the first sub-area 6 is generated by means of the first assistant subsystem 3 and the second image of the second sub-area 7 is generated by means of the second assistant subsystem 4. At least the first image 11 is displayed by means of the display device 12. It is intended that the first augmented reality 13 will be displayed by means of the display device 12. The first augmented reality 13 is generated by superimposing the first image 11 with a first assistance information generated on the base of the first image 11, the first assistance subsystem 3 as the first augmented reality content 14 and the second assistance subsystem 4 as the second augmented reality content 15 by superimposing the second assistance information generated on the base of the second image.

Overall, the example shows how the invention can be used to generate a multi-camera display for driver assistance system 1.

The invention claimed is:

1. A driver assistance system for a motor vehicle, comprising:
a first assistance subsystem configured to capture a first sub-area of an environment of the motor vehicle and a second assistance subsystem configured to capture a second sub-area of the environment, wherein the first assistance subsystem is configured to generate a first image of the first sub-area and the second assistance subsystem is configured to generate a second image of the second sub-area and the driver assistance system has a display device for displaying at least the first image, wherein the display device is configured to display a first augmented reality, wherein the first augmented reality is generated by superimposing the first image with first assistance information of the first assistance subsystem generated on the basis of the first image as first augmented reality content and by superimposing second assistance information of the second assistance subsystem generated on the basis of the second image as second augmented reality content;
wherein the first augmented reality content is constructed as a driving channel and the second augmented reality content is constructed as longitudinal distance information to an object or transverse distance information to an object; and
wherein the driver assistance system is configured to display the first augmented reality content and the second augmented reality content during semi-autonomous or autonomous driving of the motor vehicle.

2. The driver assistance system according to claim 1, wherein the display device is configured to display a second augmented reality, the second augmented reality being generated by superimposing the second image with the second augmented reality content and by superimposing with the first augmented reality content.

3. The driver assistance system according to claim 1, wherein the display device is configured to display at least the first image and the second image with the first augmented reality content and the second augmented reality content as a merged common expanded reality.

4. A driver assistance system according to claim 1, wherein the first sub-area can be captured by a first camera of the first assistance subsystem and/or the second subregion can be captured by a second camera of the second assistance subsystem.

5. The driver assistance system according to claim 1, wherein the first assistance subsystem and/or the second assistance subsystem comprise an electronic rear-view mirror.

6. The driver assistance system according to claim 1, wherein the first assistance subsystem and/or the second assistance subsystem comprise an electronic reversing camera.

7. The driver assistance system according to claim 1, which is configured such that at least the first image superimposed with the first augmented reality content and/or the first augmented reality is additionally displayed by at least one further display device of the first assistance subsystem and/or at least the second image superimposed with the second augmented reality content and/or a second augmented reality is additionally displayed by at least one still further display device of the second assistance subsystem.

8. The driver assistance system according to claim 1, wherein the driver assistance system is configured for operation when the operating state is a parking maneuver.

9. A method for operating a driver assistance system for a motor vehicle, comprising:

a first sub-area of an environment of the motor vehicle being captured by a first assistance subsystem and a second sub-area of the environment being captured by a second assistance subsystem, a first image of the first sub-area being generated by the first assistance subsystem and a second image of the second sub-area being generated by the second assistance subsystem, and at least the first image being displayed by a display device of the driver assistance system, wherein a first augmented reality is being displayed by the display device, the first augmented reality being generated by superimposition of the first image with first assistance information of the first assistance subsystem generated on the base of the first image as first augmented reality content and by superimposition with second assistance information of the second assistance subsystem generated on the base of the second image as second augmented reality content;

wherein the first augmented reality content is constructed as a driving channel and the second augmented reality content is constructed as longitudinal distance information to an object or transverse distance information to an object; and wherein the driver assistance system is configured to display the first augmented reality content and the second augmented reality content during semi-autonomous or autonomous driving of the motor vehicle.

* * * * *